United States Patent [19]
Schulte et al.

[11] Patent Number: 5,419,635
[45] Date of Patent: May 30, 1995

[54] MACHINE FOR TREATING CHOCOLATE PASTE AND METHOD FOR PRODUCING CRUMB

[75] Inventors: Manfred Schulte, Enger; Martin Hartsieker, Bad Oeynhausen; Bernd Mechias, Braunschweig; Kurt Müntener, Bad Salzuflen, all of Germany

[73] Assignee: Richard Frisse GmbH, Bad Salzuflen, Germany

[21] Appl. No.: 29,109

[22] Filed: Mar. 10, 1993

[30] Foreign Application Priority Data

Apr. 14, 1992 [CH] Switzerland .................. 01230/92

[51] Int. Cl.6 .................................................. B01F 7/04
[52] U.S. Cl. .................................. 366/85; 366/299; 366/302
[58] Field of Search ................... 366/150–154, 366/45, 301, 299, 302, 186, 324, 85

[56] References Cited

U.S. PATENT DOCUMENTS

| | | | |
|---|---|---|---|
| 3,734,472 | 5/1973 | Strohmeier | 366/154 |
| 3,782,700 | 1/1974 | Wittrock | 366/154 |
| 4,606,647 | 8/1986 | Frye | 366/150 |
| 4,844,619 | 7/1989 | Lesar et al. | 366/140 |
| 5,240,321 | 8/1993 | Miller | 366/154 |
| 5,340,214 | 8/1994 | Juzwiak | 366/299 |

FOREIGN PATENT DOCUMENTS 964131 5/1957 Germany .
1782585 10/1971 Germany .

Primary Examiner—David A. Scherbel
Assistant Examiner—Patrick F. Brinson
Attorney, Agent, or Firm—Martin A. Farber

[57] ABSTRACT

Machine for treating chocolate masses in which solid matter can be fed in and comminuted if so desired. The arrangement is designed such that in addition to a mixing and kneading device, at least one feeding screw is employed, with which a cutting procedure is carried out, preferably in simultaneous operation. The feeding screw can be made up of different individual screw elements, which are convenient for the material to be treated. This treatment is particularly suited for producing crumb.

13 Claims, 3 Drawing Sheets

MACHINE FOR TREATING CHOCOLATE PASTE AND METHOD FOR PRODUCING CRUMB

FIELD OF THE INVENTION

The invention relates to a device for treating chocolate paste in a trough comprising one at least partly cylindrical inner surface, in which there is provided at least one treating rotor with radially extending treating tools, with the treating rotor running concentrically to the cylinder walls; and to a method for producing chocolate crumb Whose ingredients are subjected at least in part to a mixing procedure.

Treating machines for mixing operations have become known in various forms and are disclosed e.g. in the DE-OS 17 82 585 and also in the DE-PS 964 131.

BACKGROUND OF THE INVENTION

A problem in treating chocolate masses may arise when also solid matter is to be kneaded in, for example nuts. The same problem may arise when the paste itself should have formed hard, cloddy particles by way of agglomeration. It has become apparent that the number of revolutions of the treating rotor, which, to a certain extent, also determines the treating performance of the device, will then be limited, particulary in such a case. At times, an accumulation of the solid matter or agglomerates to be kneaded in can then be observed on the trough wall, so that the homogeneity will no longer be completely assured. Hitherto, this manifestation has been tolerated, at the most one has taken the measure to reduce the number of revolutions of the treating rotor.

SUMMARY OF THE INVENTION

It is therefore an object of this invention to keep the performance of such a device as high as possible and yet still ensure a high homogeneity. In accordance with the invention, this is achieved by arranging, in addition to the treating rotor, a helical feeding unit crosswise to the treating rotor within the trough, which helical feeding unit is drivable by a driving mechanism in a moving sense feeding away from the trough wall.

A first step for achieving this object lies in the notion that the natural limit of the performance is given by the centrifugal force exerted by the treating tools and their rotor, which centrifugal force will naturally increase according to the number of revolutions. On the other hand, this centrifugal force acts particularly on the solid matter or agglomerates of higher density, so that finally, in certain cases, instead of the desired homogenizing a demixing may be effected.

If, however, in a second step of the invention, in addition to the treating rotor, a helical feeding unit is arranged crosswise to the treating rotor within a trough, which helical feeding unit is drivable by a driving mechanism in a moving sense feeding away from the trough wall, then the material again passes into the range of the treating tools, whereby the unfavorable effect of the centrifugal force is opposed. The arrangement in which the helical feeding unit is provided with at least one cutting edge is particularly advantageous, for by that arrangement the solid matter is reduced in size, which enhances the desired homogenizing. A further advantage lies in the fact that in this way cutting and conveying can be effected without additional expenditure of energy and without further installations, whereby also the costs are reduced.

Particularly advantageous is an arrangement in which the cutting edge itself forms the helical feeding unit because thus a single element carries out cutting and conveying operation.

When an arrangement is employed in which the cutting edges extend in a sector like way over merely one part of the circumference, thus forming edges running in a radial manner clearances will be produced between the individual sections, which clearances, on the one hand, support the mixing effect and, on the other hand, create additional edges that enhance the comminution effect. This is particularly true in an arrangement in which at least one part of the radially running edges—seen in top plan view—run under an acute angle, thus forming cutting edges.

BRIEF DESCRIPTION OF THE DRAWINGS

Other characteristics of the invention will result from the following description and the embodiments schematically shown in the drawings, in which.

DETAILED DESCRIPTION OF THE DRAWINGS

Figure 1:
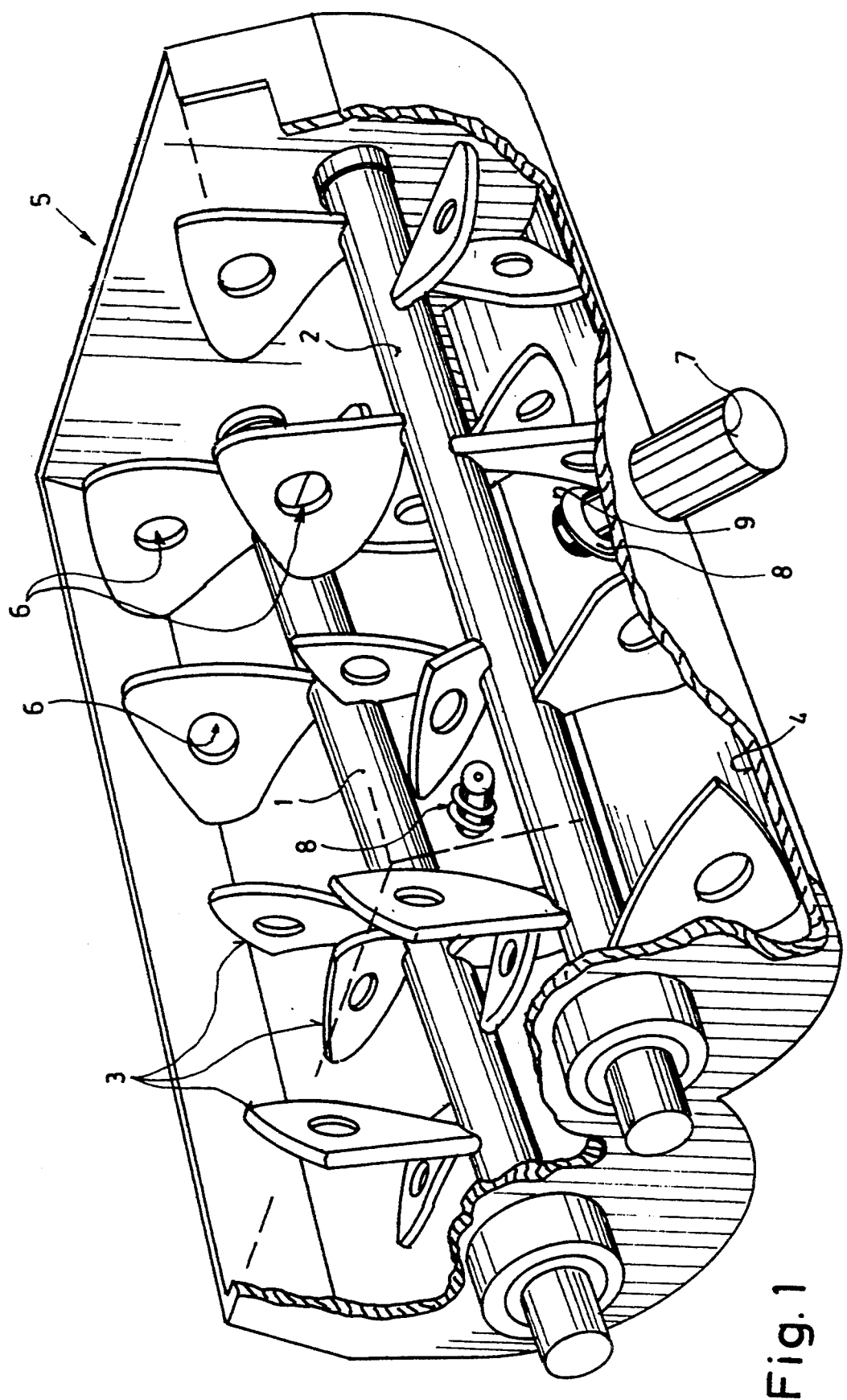
FIG. 1 shows an installation with two stirring and kneading tools situated on parallel axes, and two feeding and cutting screws.

In FIG. 1 there is represented an embodiment according to the invention. Paddle-shaped mixing blades 3 radially extending from treating rotors 1, 2 running parallel to each other cause chocolate mass to be pushed in opposite directions on cylindrical inner surfaces 4 of a mixing trough 5 running coaxially to the rotors 1,2, which thrust is broken at the respective adjacent tools 3 arranged in different directions, or under differing angles, respectively. Alternating pressing and simultaneous shearing of the rotating mixing blades leads to a kneading effect, whereby refining of the solid matter particles in the fat phase is produced. Thus, the surfaces of the mixing blades move toward and again away from each other. The paste that is contained inbetween them is thereby pressed and kneaded. The pressure effects the flow of the particles in the fat phase, for which purpose openings 6 in the paddles 3 are particularly suitable. At the same time, also larger particles contained in the paste are comminuted to a limited extent by the restricted freedom of motion, which additionally influences the mass moment of inertia.

It has become apparent that larger inclusions, or solid matter, respectively, move in the direction of the outside surface 4 due to the centrifugal acceleration. According to the invention, these parts are brought back into the circulation of the material to be kneaded by means of specially constructed helical conveying elements, in which case the helical unit could also be designed in a paddlelike way. However, it is preferred if they are simultaneously comminuted by integrated cutting edges. A combination of these two tool types can be found in FIG. 1, where one driving motor 7 each (only one is visible) turns a screw body in such a direction that the material is fed away from the wall 4, and conveniently radially in inward direction. When using this arrangement, the screw 8 advantageously comprises a cutting edge 9 on its radially outer surface.

As becomes apparent from FIG. 1, the screws 8 project diagonally in upward direction in order to achieve a motion component feeding upwards. It should be borne in mind that not only the centrifugal force, owing to the rotation of the rotors 1,2, acts on the solid matter and agglomerates contained in the chocolate paste, but that the gravitational force does so as well, for which reason these parts of larger mass, in a certain way, tend to be deposited at the bottom. The screws 8 feeding in upward direction work against this motion. When using this arrangement, the screws 8 may, in principle, project vertically in upward direction by arranging them, by way of example, on a vertical plane relative to the respective treating rotor 1 or 2. However, such an arrangement would increase the overall height of the construction, for which reason the motors 7—due to the inclined position of the screws 8—are preferably mounted in the gussets formed by the trough 5 which is conveniently cylindrically-shaped outside. However, it is to be understood that such gussets may also be formed if the outer surface of the trough were slanted only e.g. 45°. The outer curvature running parallely to the inner surface 4 shown in FIG. 1, however, results in a tempering room of uniform breadth, as can be seen from FIG. 2. From this figure, it will also be apparent that the orientation of the screws 8 could also be held in horizontal direction, which, for the reasons mentioned above, is not a preferred arrangement though, particularly since this will result in a greater overall length of the installation.

Figure 2:
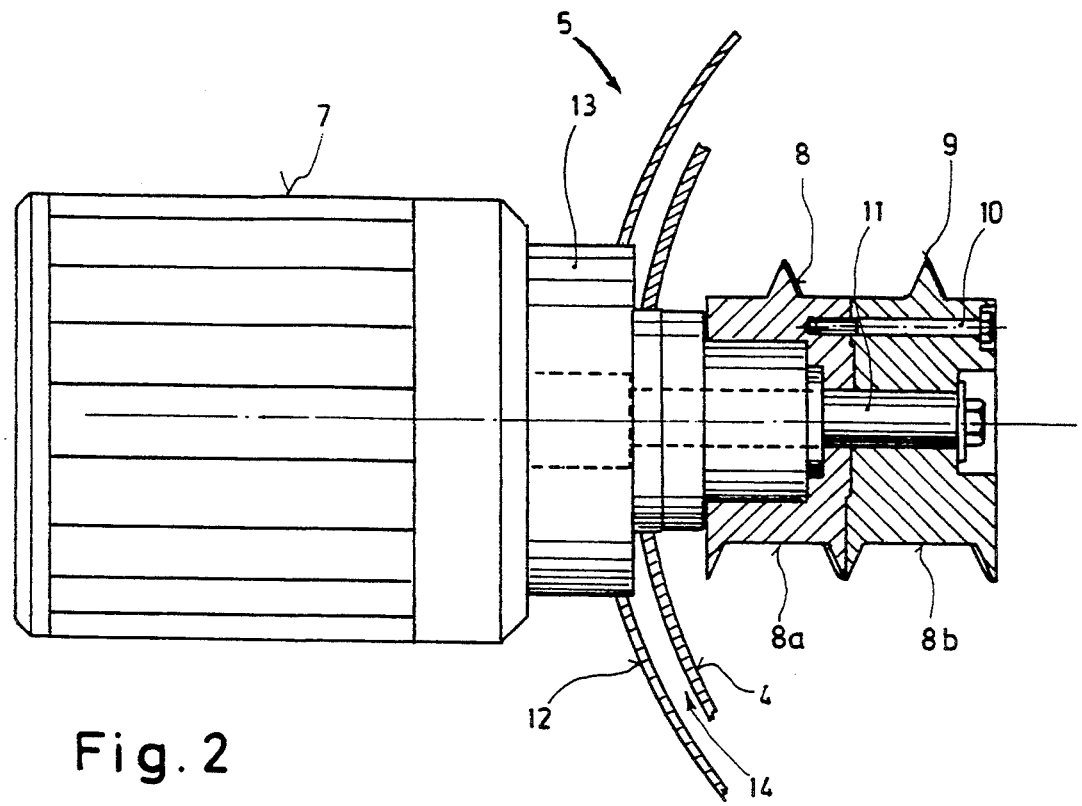
FIG. 2 illustrates the construction of such a screw in enlarged scale, partly in sectional view.
Figures 3, 4:
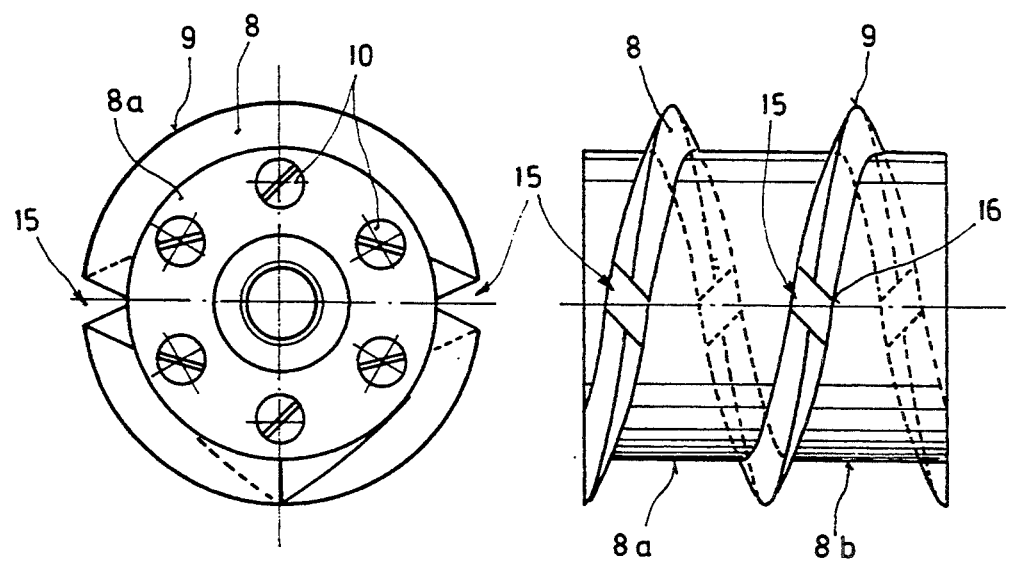
FIG. 3 represents a front view of one of the screw elements.
FIG. 4 shows a side view of two basic elements attached to each other in their built-in state.

Advantageously, the screws are made up of individual basic elements in a modular way, whose shape of the cutting edges can be adapted to the products to be treated, as can particularly be seen from FIGS. 2 to 4. Therein, for example two screw elements 8a, 8b are shown in a side-by-side arrangement, which screw elements are designed in a similar manner, complementing each other. As can be seen from FIG. 2, mounting is done, by way of example, by two traversing screws 10, yet any other construction known per se in extruders will be possible. This screw 8 is mounted on a motor shaft 11, whose motor 7 is tightly attached to an outer wall 12 of the trough 5, for example welded thereon via a flange 13. It is preferred to keep the two trough walls 4, 12 spaced apart from each other for forming a tempering room 14, so that a tempering means (cold or hot water) can be let into the room 14.

According to FIGS. 3 and 4, it corresponds to a preferred arrangement to make the screw 8 extend in a sectorlike way only over a part of the circumference of the respective screw element 8a. Thereby, on the one hand, free clearances 15, favorable to an intimate mixture are formed and, on the other hand, the cutting effect will be enhanced as well. This is particularly the case when the radially extending side edges 16 are not led parallely to the axis of the elements 8a, 8b (which would also be possible), but sloped in such a manner that an acute angle will be formed on these edges 16, so that these are formed as cutting edges. In the case of the FIGS. 1 to 4, the sector angle of the cutting edge 9 amounts to 180°.

Figure 5:
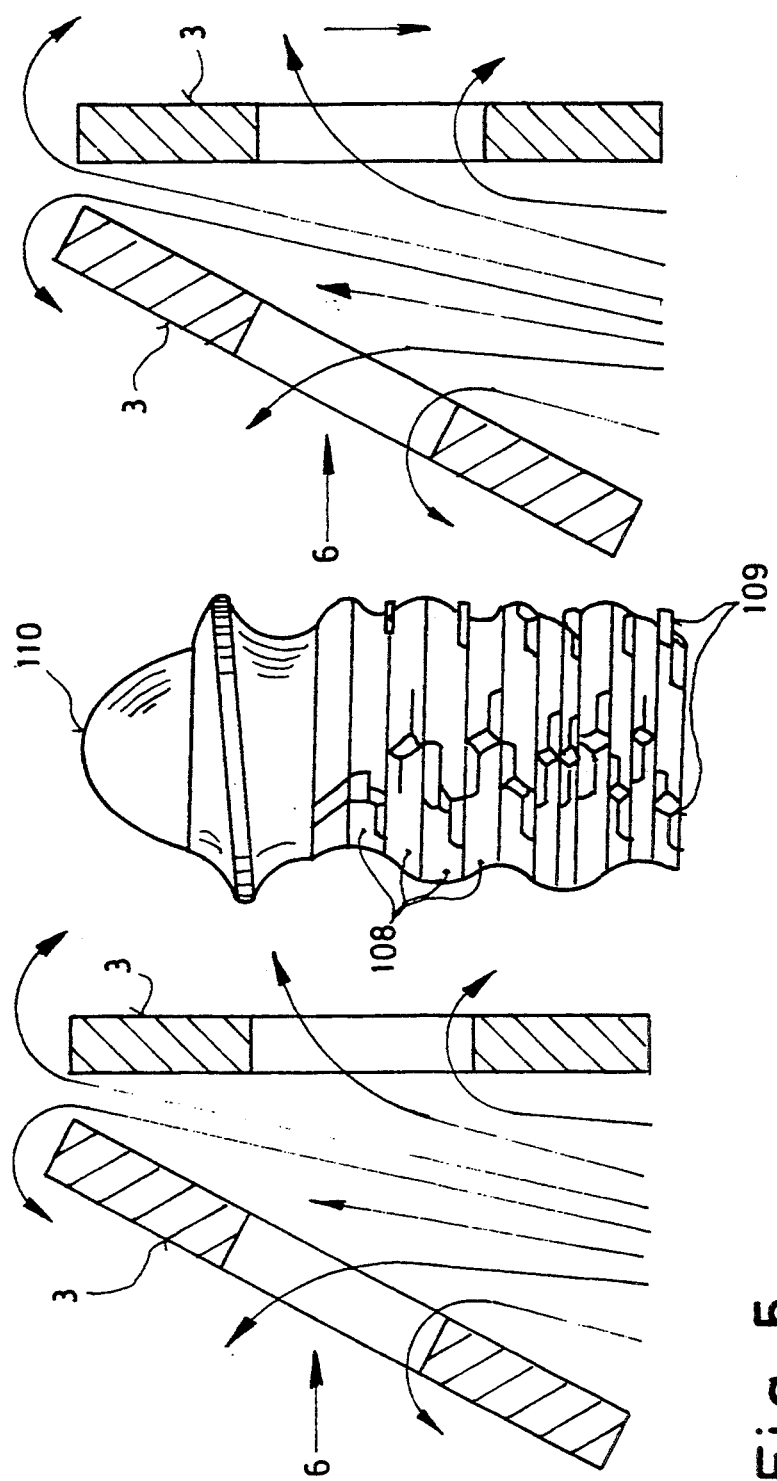
FIG. 5 illustrates a further embodiment in accordance with the invention in side view, cooperating with perforated paddle tools.

FIG. 5 represents another embodiment in which the screw is formed by individual disk-shaped screw elements 108, on which sectorlike cutting edges 109 are mounted slightly spaced apart in a Z-form or set in as independent elements between the disks 108. One single tightening screw 110 provided with a curved head is able to hold together the set of disks 108.

On the basis of FIG. 5 also the interaction with paddle tools provided with openings is illustrated. By means of their openings not only the refining procedure will be favored but at the same time also the material is led against the cutting edges 109, while the material is simultaneously taken from the disks 108 by means of the screw body and is then partly led radially in inward direction and partly passed to the respective adjacent paddle tools 3. In this way a synergetic effect will be achieved.

If in this context the refining effect has been pointed out, it should be mentioned that the rotors 1 and 2 are not provided with the paddles 3 in a preferred arrangement, but alternatively or additionally to them also comprise refining tools, as they are typical for conching machines. For this enables working up of solid matter, such as nuts, concomitantly to the conching in one single operation.

It is to be understood that within the scope of the invention numerous variants will be possible; for example a plurality of such helical feeding units 8, 9 may be distributed over the circumference and/or axially over the trough. Moreover, the knife bodies 8a, 8b do not necessarily have to be cylindrically-shaped, it would rather be conceivable as well to design them as units tapering toward the rotor 2, e.g. to make them peg-shaped. The trough 5 in its turn may be divided into several sections, as it has already been suggested by the applicant. Also the treating tools 3 may be designed differently. The trough 5 does not have to be oriented exactly horizontally although this will be preferred; a slight inclination in an axial direction would be conceivable particularly in a case where instead of batch operation a continuous operation will be aimed at. A vertical arrangement of the mixing rotors would also be conceivable. In each case the mixing rotors may be supported on both sides or on one side only, for example on a portal-shaped construction situated above the vertical mixing trough.

A particular application of the device according to the invention has surprisingly arisen for the production of crumb. For experiments have shown that the use of shearing forces under simultaneous generation of an inner motion of rotation in the trough in radial and preferably also axial direction, as described above and as it is typical for the device according to the invention, leads to the phenomenon that the consumption of expensive cocoa butter, which is usually very high in the case of crumb, can be markedly reduced. This coincides with a refinement of the flavor qualities, as one has been able to establish. This is indeed surprising and cannot be explained easily. The inventors do not want to be bound to a theory, however, the effect might be explained by the fact that due to the achieved good mixing under simultaneous generation of shearing forces a greater disintegration of the chocolate particles and in particular of the cocoa particles takes place in such a manner that more cocoa butter goes out from these and passes over into the paste, so that the addition of supplementary cocoa butter can be reduced to such an extent. Another explanation arises out of the refining effect, which is connected with the shearing forces evened out by the mixing motion described above; for the crumb manufactured in the experiments was characterized by crumb particles having a soft fat film, which resulted in a particularly fine flavor. However, it is also possible that both effects in conjunction play a part therein. At any rate the method exemplified above for manufacturing crumb under application of shearing forces and simultaneous generation of an inner motion of rotation in the trough in radial, and preferably also axial, direction represents an important aspect to be considered separately of the present invention.

What is claimed is:

1. A machine for treating chocolate paste comprising
a trough for containing said chocolate paste extending along a longitudinal axis and having
an inner surface which is at least partially cylindrical and an outer surface;
at least one rotor within said trough, said rotor having a rotor axis parallel to said longitudinal axis and treating elements extending radially from said rotor axis toward a portion of said inner surface facing said treating elements; and
feeding means extending into said trough from a location at said inner surface alongside a path of travel of one of said treating elements, said feeding means comprising at least one helical feeding element each with a helical part being turnable around a corresponding turning axis oriented crosswise to said rotor axis; and
motor means for driving said at least one feeding element around said corresponding turning axis in such a way that chocolate paste is transported away from said portion of said inner surface facing said treating element.

2. A machine as claimed in claim 1 wherein said feeding means comprises at least one cutting edge.

3. A machine as claimed in claim 2 wherein said at least one cutting edge is forming said helical part of at least one of said feeding elements.

4. A machine as claimed in claim 2 wherein each of said at least one cutting edge extends only partially around said corresponding turning axis and has a radial end edge at both ends.

5. A machine as claimed in claim 4 wherein at least one of said end edges is a sharp edge forming a radial cutter.

6. A machine as claimed in claim 1 wherein said helical part comprises more then one corresponding screw element.

7. A machine as claimed in claim 1 wherein said treating elements are paddles with passage openings at a radial distance range from said rotor axis corresponding to the radial distance range of said helical feeding element.

8. A machine as claimed in claim 1 wherein each of said turning axis of said at least one helical feeding element is inclined to a horizontal plane for causing a transport of chocolate paste upward in the direction of said turning axis.

9. A machine as claimed in claim 8 further comprising open space inbetween said outer surface and a horizontal plane below said trough and vertical planes at the two sides of said trough wherein said motor means are extending from said outer surface into said open space.

10. A machine as claimed in claim 9, wherein said outer surface is cylindrical.

11. A machine as claimed in claim 1 wherein at least a part of said treating elements are kneading elements of a conching machine.

12. A machine for treating a pasty material comprising
a trough for containing said pasty material extending along a longitudinal axis;
at least one rotor within said trough, said rotor having a rotor axis parallel to said longitudinal axis, and treating elements extending radially from said rotor axis, said trough having an inner surface facing said treating elements; and
feeding means extending into said trough from a location at said inner surface alongside a path of travel of one of said treating elements, said feeding means comprising at least one helical feeding element each with a helical part being turnable around a corresponding turning axis oriented crosswise to said rotor axis, the helical feeding element having a plurality of spaced-apart helical flights with peripherally extending cutting edges on the helical flights; and
motor means for driving said at least one feeding element around said corresponding turning axis for transporting said pasty material away from said inner surface.

13. A machine for treating pasty material comprising
a trough for containing said pasty material extending along a longitudinal axis;
at least one rotor within said trough, said rotor having a rotor axis parallel to said longitudinal axis, and treating elements extending radially from said rotor axis for mixing said pasty material, said trough having an inner surface facing said treating elements; and
feeding means extending into said trough from a location at said inner surface alongside a path of travel of one of said treating elements, said feeding means comprising means for transporting the pasty material away from said inner surface and into the path of travel of at least one of said treating elements.

* * * * *